(12) United States Patent
Liou

(10) Patent No.: US 7,052,312 B2
(45) Date of Patent: May 30, 2006

(54) MULTIPLE-IN-ONE RETAINING SEAT

(76) Inventor: Chii-Moon Liou, 235 P.O. Box 10-69, Chung-Ho, Taipei (TW)

( * ) Notice: Subject to any disclaimer, the term of this patent is extended or adjusted under 35 U.S.C. 154(b) by 244 days.

(21) Appl. No.: 10/795,865

(22) Filed: Mar. 9, 2004

(65) Prior Publication Data

US 2005/0202717 A1 Sep. 15, 2005

(51) Int. Cl.
*H01R 13/60* (2006.01)

(52) U.S. Cl. ..................................... 439/529; 439/631
(58) Field of Classification Search ................ 439/529, 439/379, 455, 929, 945
See application file for complete search history.

(56) References Cited

U.S. PATENT DOCUMENTS

| | | | | |
|---|---|---|---|---|
| 6,189,056 B1 * | 2/2001 | Ogura et al. | .................. | 710/62 |
| 6,377,825 B1 * | 4/2002 | Kennedy et al. | ......... | 455/569.2 |
| 6,427,959 B1 * | 8/2002 | Kalis et al. | ............ | 248/288.11 |
| 6,495,988 B1 * | 12/2002 | Liao | ............................ | 320/111 |
| 6,626,703 B1 * | 9/2003 | Hsin | ........................... | 439/638 |
| 6,699,188 B1 * | 3/2004 | Wessel | ........................ | 600/300 |
| 6,716,103 B1 * | 4/2004 | Eck et al. | ..................... | 463/45 |
| 6,762,585 B1 * | 7/2004 | Liao | ........................... | 320/107 |

* cited by examiner

*Primary Examiner*—Ross Gushi
*Assistant Examiner*—Phuongchi Nguyen

(57) ABSTRACT

A multiple-in-one retaining seat comprises a retaining seat; two lateral front sides of the retaining seat being installed with two frames; a lower side of the center of the retaining seat being installed with a receptacle for receiving the personal digital assistant; an interface cartridge inserted in the retaining seat for transferring received signal to the personal digital assistant through the retaining seat; a circuit board installed in an embedding groove at an upper end of the backside of the retaining seat; the circuit board being connected to a slot seat; a lateral side of the embedding groove being protruded with a mask for receiving a speaker; the speaker being electrically connected to the circuit board for providing a hand free function; a slot being formed in the slot seat for receiving the interface cartridge; and two guide posts are installed on the retaining seat for positioning the interface cartridge.

5 Claims, 7 Drawing Sheets

MULTIPLE-IN-ONE RETAINING SEAT

FIELD OF THE INVENTION

The present invention relates to retaining seats, and particular to a multiple-in-one retaining seat, wherein an interface cartridge is replaceable rapidly and data can be transferred wirelessly by using the cartridge. Thereby, at least one peripheral can be combined to the retaining seat. Moreover, a multiple wireless devices can be combined in a compact volume by using the present invention.

BACKGROUND OF THE INVENTION

Referring to FIGS. 1 and 2, most of the prior art personal digital assistants (PDA) 1 or flat computers 11 are combined with compact flash (CF) memory cards or secure digital (SD) memory cards for storing data. The prior art memory card 10 installed with a blue tooth wireless communication module 12 has a function of blue tooth wireless communication. The personal digital assistant (PDA) 1 or flat computer 11 is further combined with a satellite receiver 13, a GSM communication module 14, and a GPRS communication module 15 for navigation of satellites and wireless communication. However, the interface slot of the personal digital assistant 1 only receives one memory card 10. To improve this defect, external interface slot is introduced so that a larger volume is required.

The various objects and advantages of the present invention will be more readily understood from the following detailed description when read in conjunction with the appended drawing.

SUMMARY OF THE INVENTION

Accordingly, the primary object of the present invention is to provide a multiple-in-one retaining seat, wherein an interface cartridge is replaceable rapidly so that data can be received wirelessly. Thereby, at least one peripheral can be combined to the retaining seat. Moreover, a multiple wireless devices is combined in a compact volume.

To achieve above objects, the present invention provides a multiple-in-one retaining seat which comprises a retaining seat; two lateral front sides of the retaining seat being installed with two frames; a lower side of the center of the retaining seat being installed with a receptacle for receiving the personal digital assistant; an interface cartridge inserted in the retaining seat for transferring received signal to the personal digital assistant through the retaining seat; a circuit board installed in an embedding groove at an upper end of the backside of the retaining seat; the circuit board being connected to a slot seat; a lateral side of the embedding groove being protruded with a mask for receiving a speaker; the speaker being electrically connected to the circuit board for providing a hand free function; a slot being formed in the slot seat for receiving the interface cartridge; and two guide posts being installed on the retaining seat for positioning the interface cartridge.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
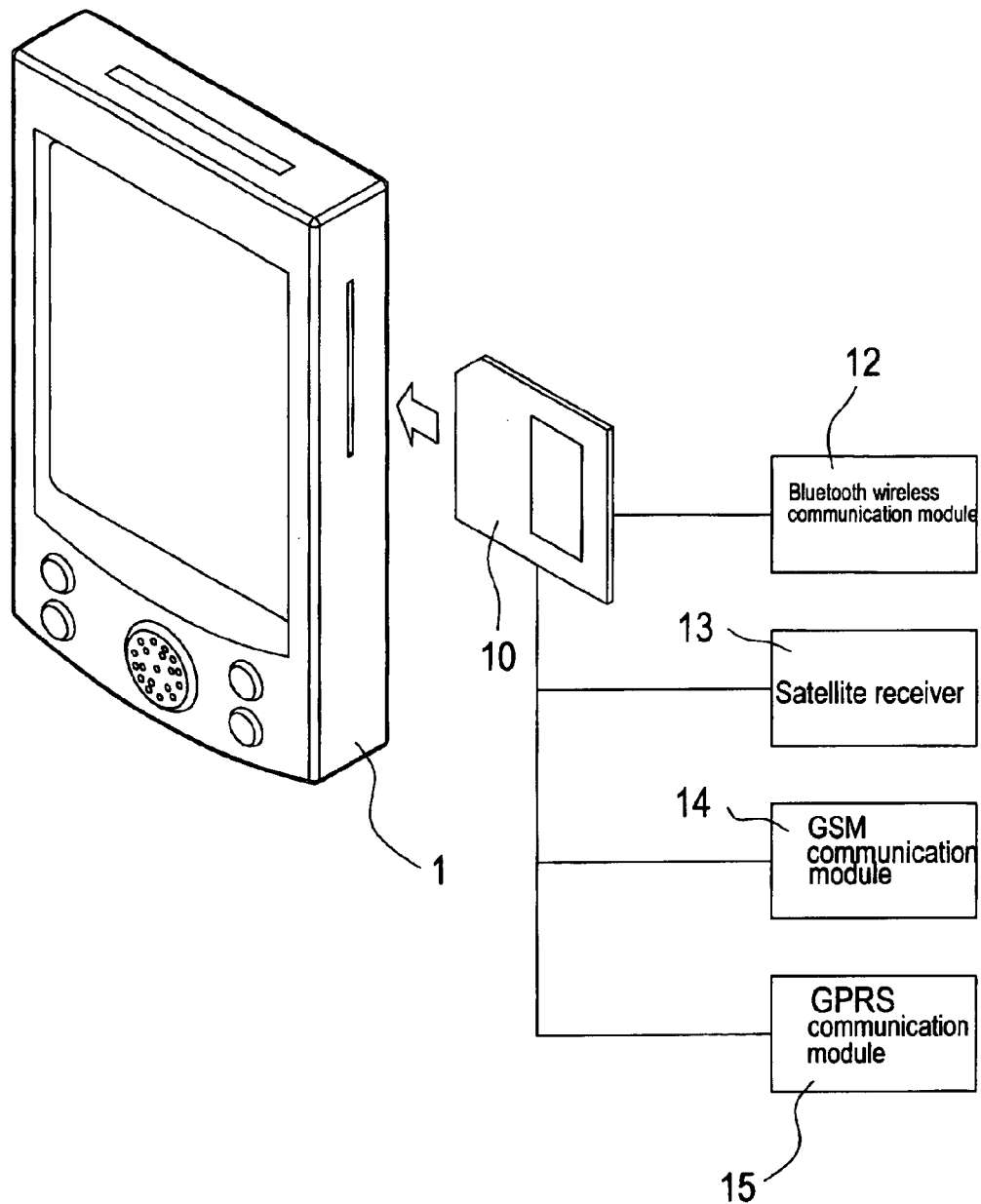
FIG. 1 shows the use of the prior art personal digital assistant and the memory card.
Figure 2:
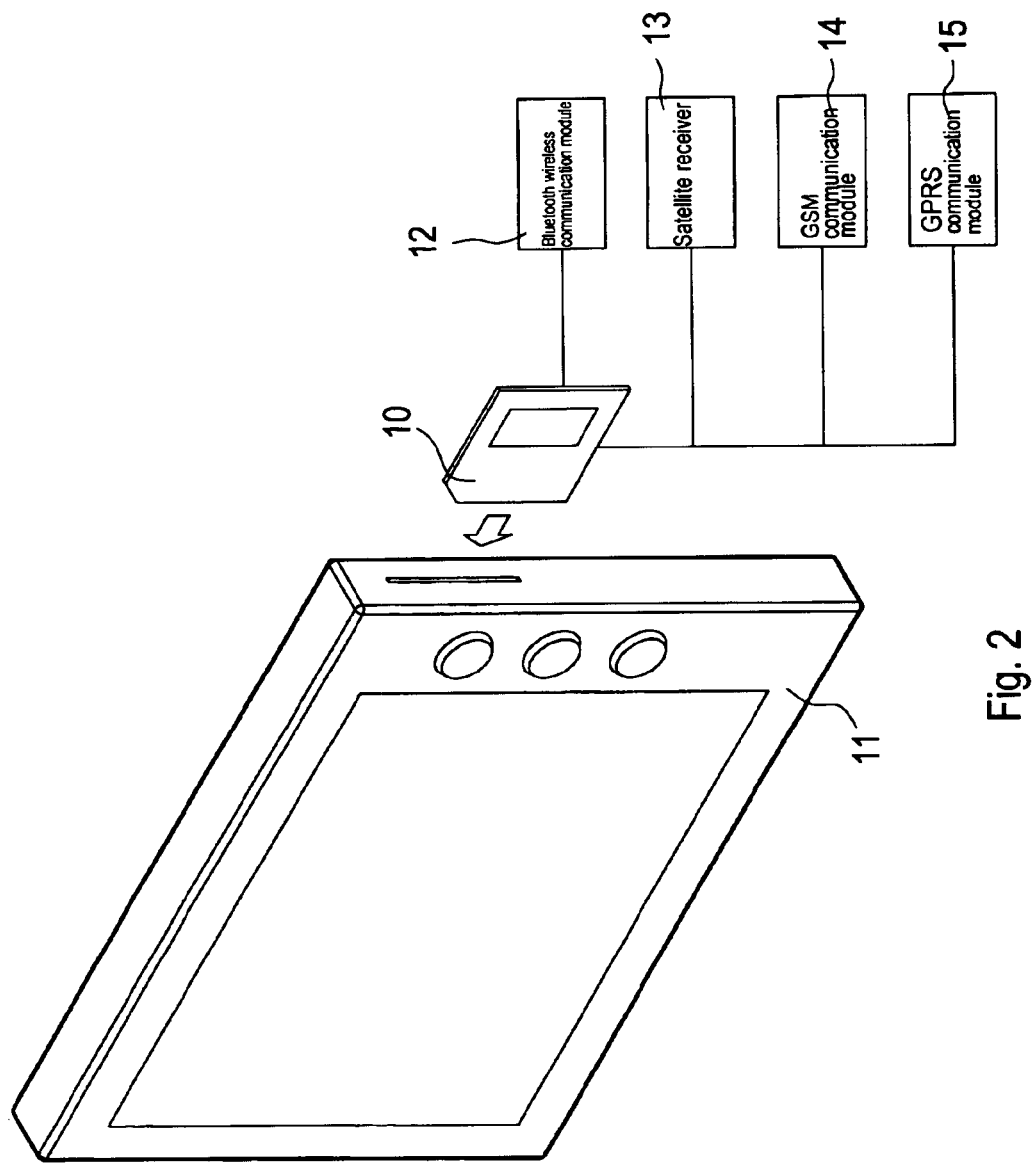
FIG. 2 shows the use of prior art flat computer and the memory card.
Figure 3:
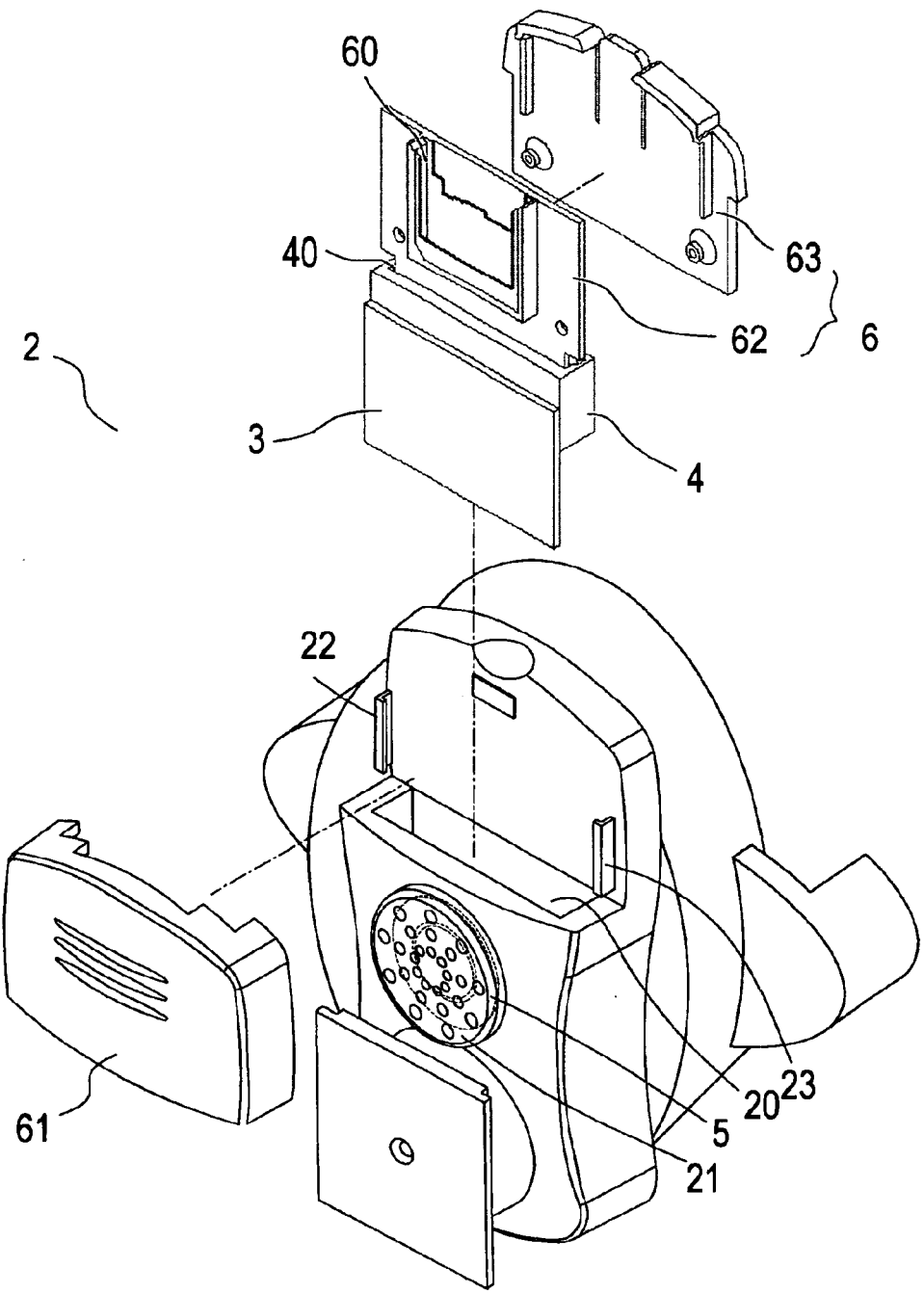
FIG. 3 is an exploded perspective view of the present invention.
Figure 4:
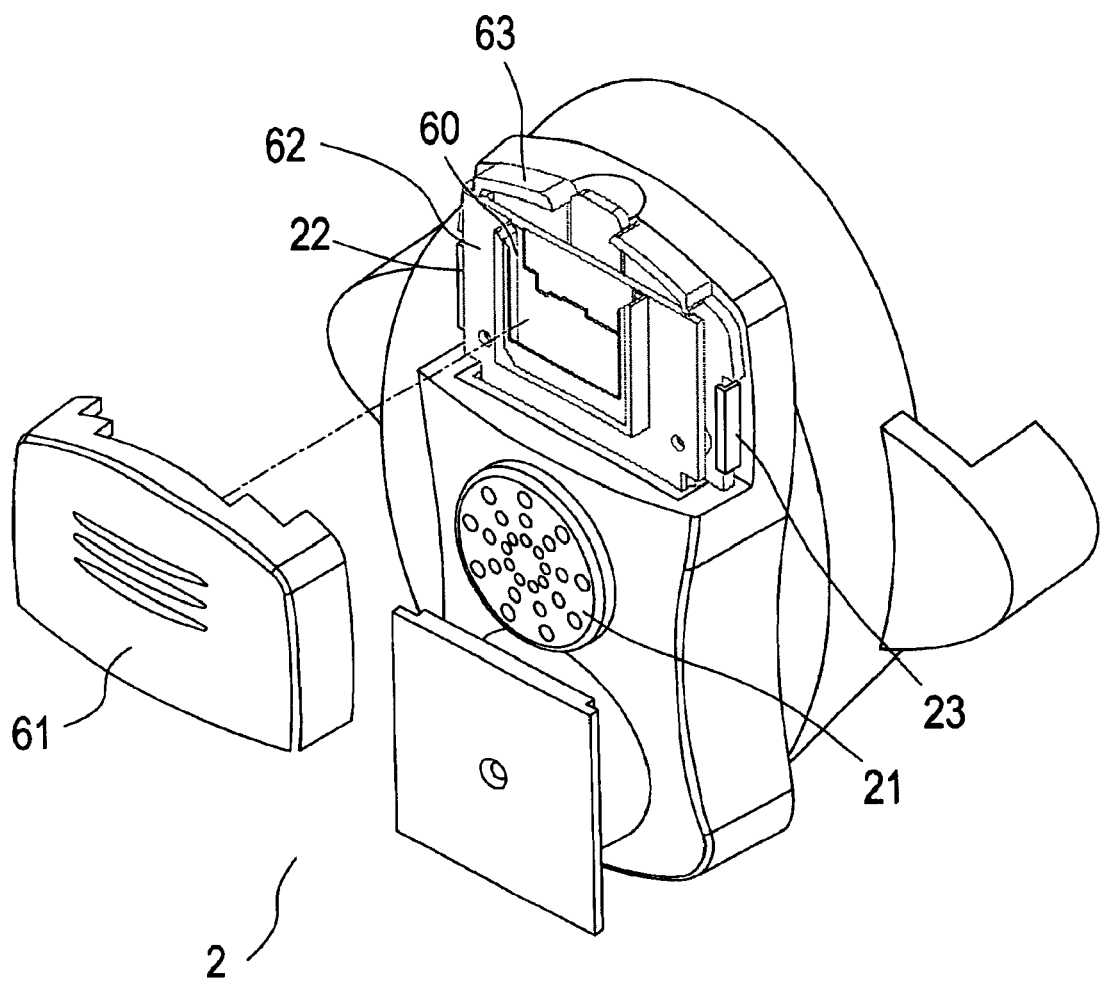
FIG. 4 shows the assembly of the present invention.
Figure 5:
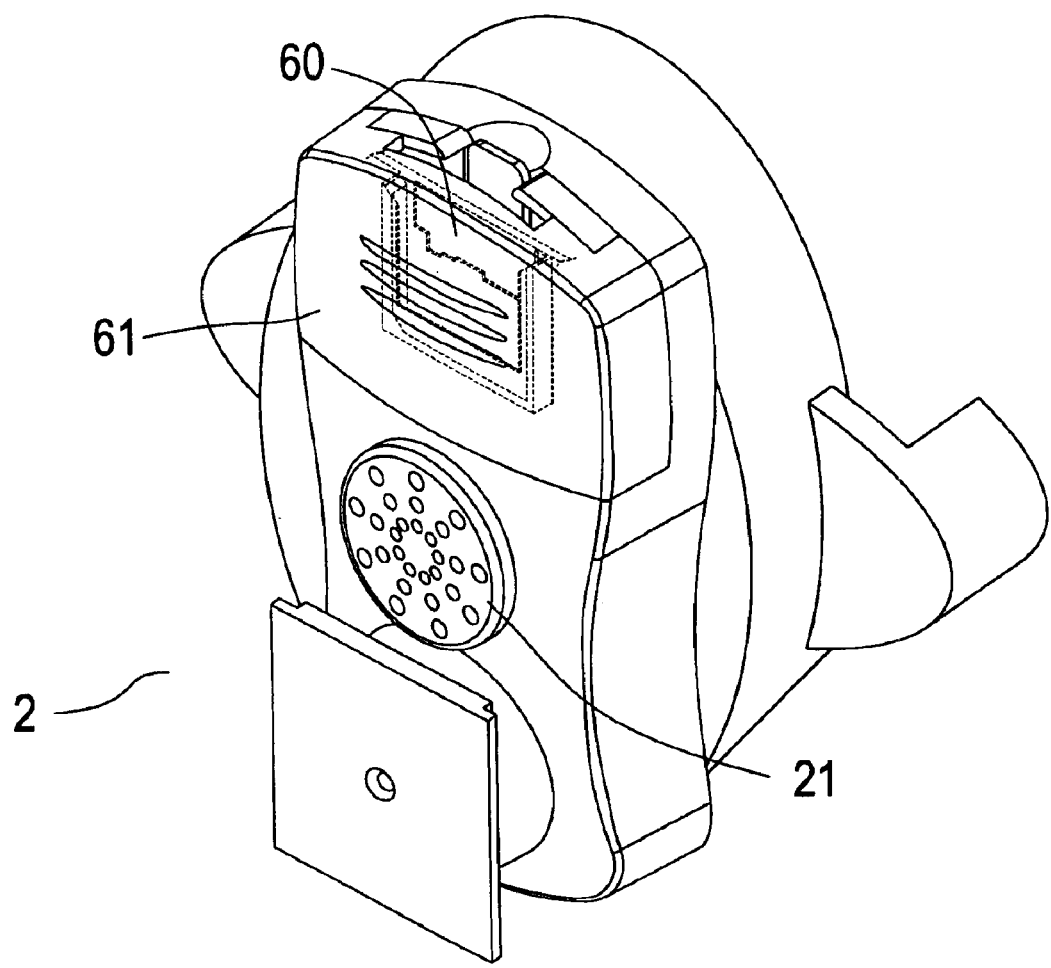
FIG. 5 is an assembled cross section view of the present invention.
Figure 6:
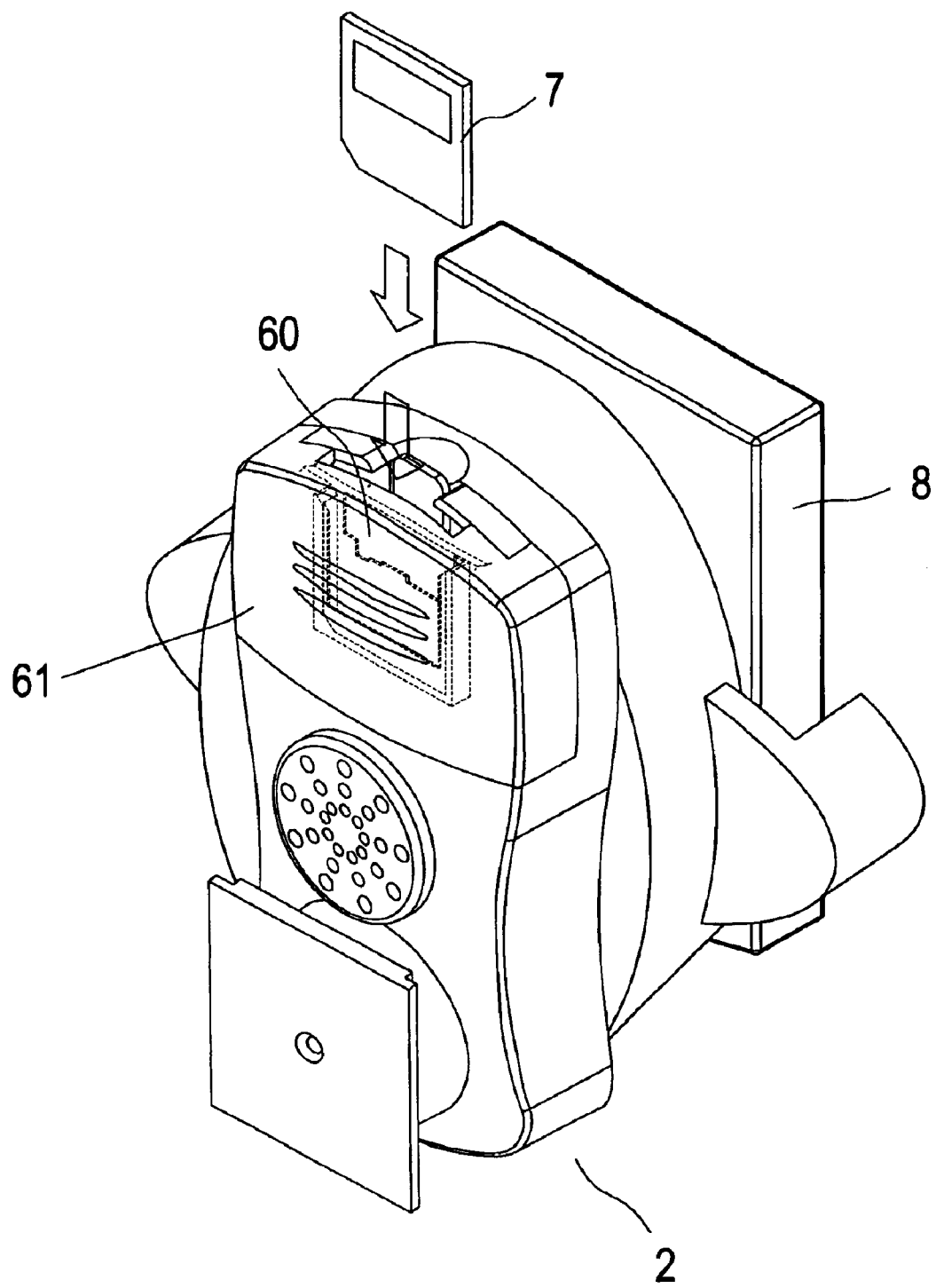
FIG. 6 shows another embodiment of the present invention.

With reference to FIGS. 3, 4 and 5, the retaining seat device of a bicycle auxiliary handle of the present invention is illustrated. The retaining seat 2 includes a circuit board 3, a slot seat 4, a speaker 5, an interface cartridge 6, a cover 61, a cartridge 62, a cove plate 63. An upper end of the backside of the retaining seat 2 is an embedding groove 20. A circuit board 3 is installed in the embedding groove 20, which is connected to the slot seat 4 thereabove. A lateral side of the embedding groove 20 is protruded with a mask 21 for receiving a speaker 5. The speaker 5 is electrically connected to the circuit board 3 for providing a hand free function. A slot 40 is formed in the slot set 4 for receiving the interface cartridge 6. Two guide posts 22, 23 are installed on the retaining seat 2 for positioning the interface cartridge 6 as the interface cartridge 6 is received in the slot 40. Thereby, the retaining seat 2 can receive the interface cartridge 6 rapidly. The interface cartridge 6 is formed by a cover 61, a cartridge body 62, and a cover plate 62. The cartridge body 62 is installed in a middle portion of the interface cartridge 6. A front end of the cartridge 62 is installed with the cover 61 and a rear end thereof is installed with the cove plate 63. The cover 61 and the cove plate 63 enclose the front the rear sides of the cartridge body 62. A front side of the cartridge body is formed with a hollow groove 60 for receiving a memory card 7.

In the application of the multiple-in-one retaining seat of the present invention, two lateral front sides of the retaining seat 2 are installed with frames 24, 25. A lower side of the center of the retaining seat 2 is installed with a receptacle 26 for receiving the personal digital assistant 1. The interface cartridge 6 inserted in the retaining seat 2 transfers received signals to the personal digital assistant 1 through the retaining seat 2.

Moreover, in the present invention, the interface cartridge 6 is replaceable. The slot seat 4 and the interface cartridge 6 are replaceable so as to achieve the object of connecting the retaining seat 2 and the interface cartridge 6 rapidly.

Advantages of the present invention will be described in the following. In the present invention, the interface cartridge is replaceable rapidly so that data can be received wirelessly. Thereby, at least one peripheral can be combined to the retaining seat. Moreover, a multiple wireless devices can be combined in a compact volume.

Figure 7:
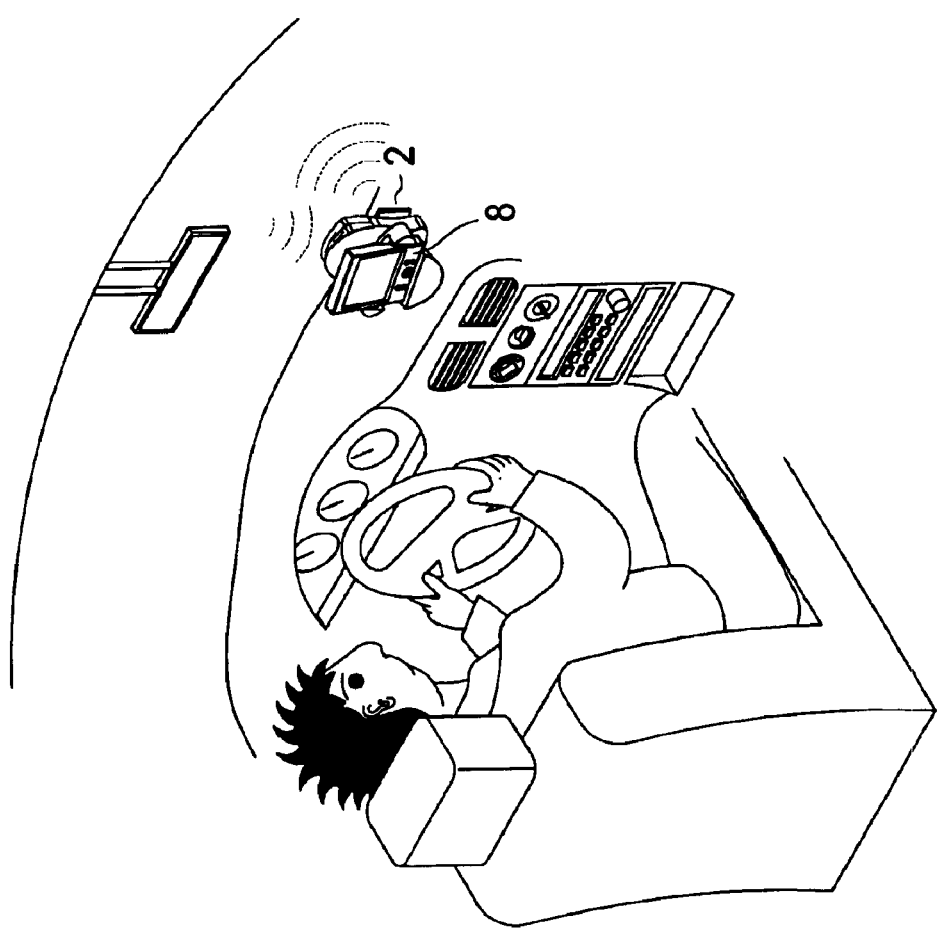
FIG. 7 shows a further embodiment of the present invention.

FIG. 7 shows one application of the present invention, where a display 8 is added to the retaining seat 2.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A multiple-in-one retaining seat comprising:

a retaining seat; two lateral front sides of the retaining seat being installed with two frames; a lower side of the center of the retaining seat being installed with a receptacle for receiving the personal digital assistant;

an interface cartridge inserted in the retaining seat for transferring received signals to the personal digital assistant through the retaining seat;

a circuit board installed in an embedding groove in an upper end of the backside of the retaining seat; the circuit board being connected to a slot seat thereabove; a lateral side of the embedding groove being protruded with a mask for receiving a speaker; the speaker being electrically connected to the circuit board for providing a hand free function;

a slot being formed in the slot seat for receiving the interface cartridge; and two guide posts being installed on the retaining seat for positioning the interface cartridge as the interface cartridge being received in the slot.

2. The multiple-in-one retaining seat as claimed in claim 1, wherein the interface cartridge being formed with a cover, a cartridge body, and a cover plate; the cartridge body is installed in a middle portion of the interface cartridge; a front end of the cartridge is installed with the cover and a rear end thereof is installed with the cove plate; the cover and the cove plate encloses the front the rear sides of the cartridge body; a front side of the cartridge body is formed with a hollow groove for receiving a memory card.

3. The multiple-in-one retaining seat as claimed in claim 1, wherein the interface cartridge is replaceable; the slot seat and interface cartridge are updated so as to connect the retaining seat and the interface cartridge rapidly.

4. The multiple-in-one retaining seat as claimed in claim 1, wherein a wireless transmission device is installed in the interface cartridge for storing received data in the memory card.

5. The multiple-in-one retaining seat as claimed in claim 1, wherein the embedding groove at an upper end of the backside of the retaining seat is protruded with the mask for receiving the speaker; the speaker is electrically connected to the circuit board for providing a hand free function.

* * * * *